United States Patent
Soria et al.

(10) Patent No.: US 10,352,273 B2
(45) Date of Patent: Jul. 16, 2019

(54) TRACK BEAM WITH COMPOSITE LUG

(71) Applicant: ROHR, INC., Chula Vista, CA (US)

(72) Inventors: Christian Soria, La Mesa, CA (US); Charles M. Biset, San Diego, CA (US); Andrew S. Gurney, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 403 days.

(21) Appl. No.: 15/346,291

(22) Filed: Nov. 8, 2016

(65) Prior Publication Data

US 2018/0128205 A1 May 10, 2018

(51) Int. Cl.
*F16B 17/00* (2006.01)
*F02K 1/56* (2006.01)
*F16M 13/02* (2006.01)
*F01D 25/28* (2006.01)
*F02K 1/74* (2006.01)

(52) U.S. Cl.
CPC .................. *F02K 1/56* (2013.01); *F01D 25/28* (2013.01); *F02K 1/74* (2013.01); *F16B 17/00* (2013.01); *F16M 13/02* (2013.01); F05D 2230/50 (2013.01); F05D 2260/30 (2013.01); F05D 2300/603 (2013.01); F05D 2300/6034 (2013.01); Y02T 50/672 (2013.01)

(58) Field of Classification Search
CPC ............. Y02T 50/672; F05D 2300/603; F05D 2300/6034; F05D 2260/30; F05D 2230/50; F01D 25/28; F02K 1/74; F02K 1/56; F16M 13/02; F16B 17/00; F16B 17/008

See application file for complete search history.

(56) References Cited

U.S. PATENT DOCUMENTS

| | | | |
|---|---|---|---|
| 2,065,843 A | 12/1936 | Van Uum | |
| 3,024,605 A * | 3/1962 | Nash | F02K 1/60 239/265.19 |
| 3,295,806 A | 1/1967 | Modeme | |
| 3,345,706 A | 10/1967 | Stokes | |
| 3,501,090 A * | 3/1970 | Losee | F01D 5/282 416/189 |
| 3,758,232 A * | 9/1973 | Wallett | F01D 5/282 416/213 R |
| 4,098,559 A * | 7/1978 | Price | F01D 5/225 416/212 A |
| 4,369,945 A | 1/1983 | Mantoan | |
| 4,395,009 A | 7/1983 | Bormke | |
| 4,679,754 A | 7/1987 | Richards | |
| 4,786,347 A * | 11/1988 | Angus | B29C 45/0005 156/172 |
| 5,192,384 A | 3/1993 | Barrier et al. | |
| 5,239,822 A * | 8/1993 | Buchacher | B64D 29/00 244/110 B |
| 5,292,231 A * | 3/1994 | Lauzeille | F01D 5/282 416/229 A |
| 6,964,169 B2 | 11/2005 | Pancou et al. | |
| 7,690,164 B2 | 4/2010 | Walker et al. | |

(Continued)

*Primary Examiner* — Matthew R Mcmahon
(74) *Attorney, Agent, or Firm* — Snell & Wilmer, L.L.P.

(57) ABSTRACT

A thrust reverser for a nacelle may comprise a composite track beam and a composite lug. The composite lug may be inserted through a through-hole in the composite track beam. Continuous fibers in the composite lug may provide strength in the in-plane direction.

9 Claims, 8 Drawing Sheets

(56) References Cited

U.S. PATENT DOCUMENTS

| | | | | |
|---|---|---|---|---|
| 7,871,486 B2* | 1/2011 | Xie | | F01D 25/243 |
| | | | | 156/166 |
| 7,908,868 B2* | 3/2011 | Bunel | | F02K 3/10 |
| | | | | 60/761 |
| 8,235,345 B2* | 8/2012 | Sadil | | F02K 3/10 |
| | | | | 244/118.6 |
| 8,251,651 B2* | 8/2012 | Propheter-Hinckley | | |
| | | | | F01D 5/284 |
| | | | | 415/200 |
| 8,347,500 B2* | 1/2013 | Durocher | | F01D 9/065 |
| | | | | 29/889.2 |
| 8,402,765 B2* | 3/2013 | Amkraut | | F02K 1/09 |
| | | | | 60/771 |
| 8,511,973 B2* | 8/2013 | Ramlaoui | | B64D 29/06 |
| | | | | 415/128 |
| 8,636,466 B2* | 1/2014 | Cortequisse | | F01D 9/042 |
| | | | | 415/138 |
| 8,905,719 B2* | 12/2014 | Kray | | F01D 9/042 |
| | | | | 416/230 |
| 8,915,157 B1 | 12/2014 | Kerbs | | |
| 9,409,650 B2 | 8/2016 | Bellanger et al. | | |
| 9,463,880 B2* | 10/2016 | Vetter | | B29D 99/0014 |
| 9,470,151 B2* | 10/2016 | Ruberte Sanchez | | F02K 3/10 |
| 9,777,671 B2* | 10/2017 | Ramlaoui | | F02K 1/09 |
| 9,903,313 B2* | 2/2018 | Aten | | F02K 1/72 |
| 9,915,157 B2* | 3/2018 | Oudin | | F01D 25/28 |
| 9,970,387 B2* | 5/2018 | Frank | | F02K 1/09 |
| 10,145,382 B2* | 12/2018 | Kray | | F04D 29/023 |
| 2004/0265536 A1* | 12/2004 | Sana | | B29C 70/345 |
| | | | | 428/119 |
| 2005/0125985 A1* | 6/2005 | Adams | | B21J 15/02 |
| | | | | 29/524.1 |
| 2010/0229528 A1* | 9/2010 | Ramlaoui | | F02K 1/09 |
| | | | | 60/226.2 |
| 2013/0161414 A1* | 6/2013 | Ramlaoui | | F02K 1/09 |
| | | | | 239/265.19 |
| 2014/0349538 A1* | 11/2014 | Marchal | | B29C 70/24 |
| | | | | 442/206 |
| 2015/0308378 A1* | 10/2015 | Aten | | F02K 1/72 |
| | | | | 239/265.19 |
| 2016/0169158 A9* | 6/2016 | Ramlaoui | | F02K 1/763 |
| | | | | 239/265.19 |
| 2016/0201505 A1* | 7/2016 | Clarkson | | F01D 25/243 |
| | | | | 415/200 |
| 2018/0080478 A1* | 3/2018 | Langenbrunner | | F04D 29/644 |
| 2018/0170566 A1* | 6/2018 | Paolini | | B64D 29/06 |

* cited by examiner

TRACK BEAM WITH COMPOSITE LUG

FIELD

The present disclosure relates to an aircraft engine thrust reverser, and more particularly, to composite lugs for thrust reverser track beams.

BACKGROUND

Nacelle structures for jet engines of an aircraft provide a housing within which the jet engine is supported. The nacelle structure typically includes a thrust reverser that can provide assistance in slowing the aircraft by redirecting the engine thrust. The thrust reverser includes a panel (referred to as a translating sleeve) of the nacelle that is translated between a stowed position, for normal operation during flight, and a deployed position, for redirecting the engine thrust, such as during landing of the aircraft. The thrust reverser panel slides along a track beam to move between the stowed position and the deployed position.

Thrust reverser track beams support the thrust reverser panel during translation and join the thrust reverser panels and an engine strut or pylon for under-wing carriage of the nacelle. Other installations of jet engines may enclose the engine within a fuselage portion of the aircraft, in which case the beams join the thrust reverser panels to the aircraft fuselage.

Thrust reverser track beams have conventionally been machined from solid ingots of metal, such as aluminum. As engine diameters and bypass ratios have increased, the engine weight has increased commensurately. Such engines use larger and stronger beams. More recently, composite track beams have been proposed, in which the generally closed-form beam is constructed from a composite material, such as graphite fiber layers impregnated with a resin material to form a graphite composite structure. Existing lugs for track beams are coupled to the track beam via co-curing, adhesive bonding, or fastening with the lug attached on the same side of the track beam as the component to which the lug is attaching. The design of lugs incorporated into composite beams often rely on interlaminar properties of composite materials to support high structural loads. However, the interlaminar properties are generally weaker than the in-plane properties of the composite materials.

SUMMARY

A track beam for an aircraft nacelle may comprise a longitudinal panel and a lug coupled to the longitudinal panel. The lug may comprise a portion of a first flange located on a first side of the longitudinal panel; a support located on a second side of the longitudinal panel; and a continuous fiber located partially within the first flange and partially within the support.

In various embodiments, the lug may comprise a composite material. The lug may comprise a thermoplastic material. The longitudinal panel and the lug may form a unitary component. The lug may comprise a second flange on the first side of the longitudinal panel. A second continuous fiber may be located partially within the second flange and partially within the support. The lug may comprise at least one of a U-shape or a Pi-shape. The longitudinal panel and the lug may be co-cured. The flange may comprise an attachment feature.

A composite lug for a track beam may comprise a support; a first flange coupled to and substantially perpendicular to the support; a second flange coupled to and substantially perpendicular to the support; and a first continuous fiber extending along the first flange, the support, and the second flange.

In various embodiments, the composite lug may comprise a thermoplastic material. The first flange may comprise a first attachment feature, and the second flange may comprise a second attachment feature. The lug may comprise a Pi-shape. A second continuous fiber may extend from a first end of the support to a second end of the support, wherein the second continuous fiber is not located within the first flange or the second flange. A third continuous fiber may extend from the first end of the support into the first flange.

A method of manufacturing a composite track beam may comprise forming a composite lug; inserting the composite lug through a through-hole in a composite longitudinal panel; and coupling the composite lug to the composite longitudinal panel.

In various embodiments, forming the lug may comprise cutting a piece of material from a composite sheet and bending the piece of material into a U-shape. The composite sheet may comprise continuous fibers. The coupling may comprise heating the composite lug and the composite longitudinal panel. The composite lug and the composite longitudinal panel may form a unitary component.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

In various embodiments, a thrust reverser may be configured to direct the flow of bypass air in a forward direction, causing reverse thrust. In this regard, a thrust reverser may comprise a translating sleeve which may be configured to translate forward and aft (e.g., to stow and deploy). The translating sleeve may be configured to translate forward and aft adjacent to at least one of a hinge beam (i.e., the upper track beam) and a latch beam (i.e., the lower track beam). Accordingly, a hinge beam and a latch beam may be referred to herein collectively as track beams and/or a track beam. The track beams may comprise a composite material, such as carbon fibers in a resin matrix. The track beams may comprise lugs, which allow other components to couple to the track beams. The lugs may comprise a composite material. A lug may extend through one or more through-holes in the track beam. The lug may comprise an attachment feature on a first side of the track beam, and a supporting back plate on an opposite second side of the track beam. The lug may comprise continuous fibers running through the lug, such that the in-plane properties of the fibers may provide strength to the lug and the track beam.

Figure 1:
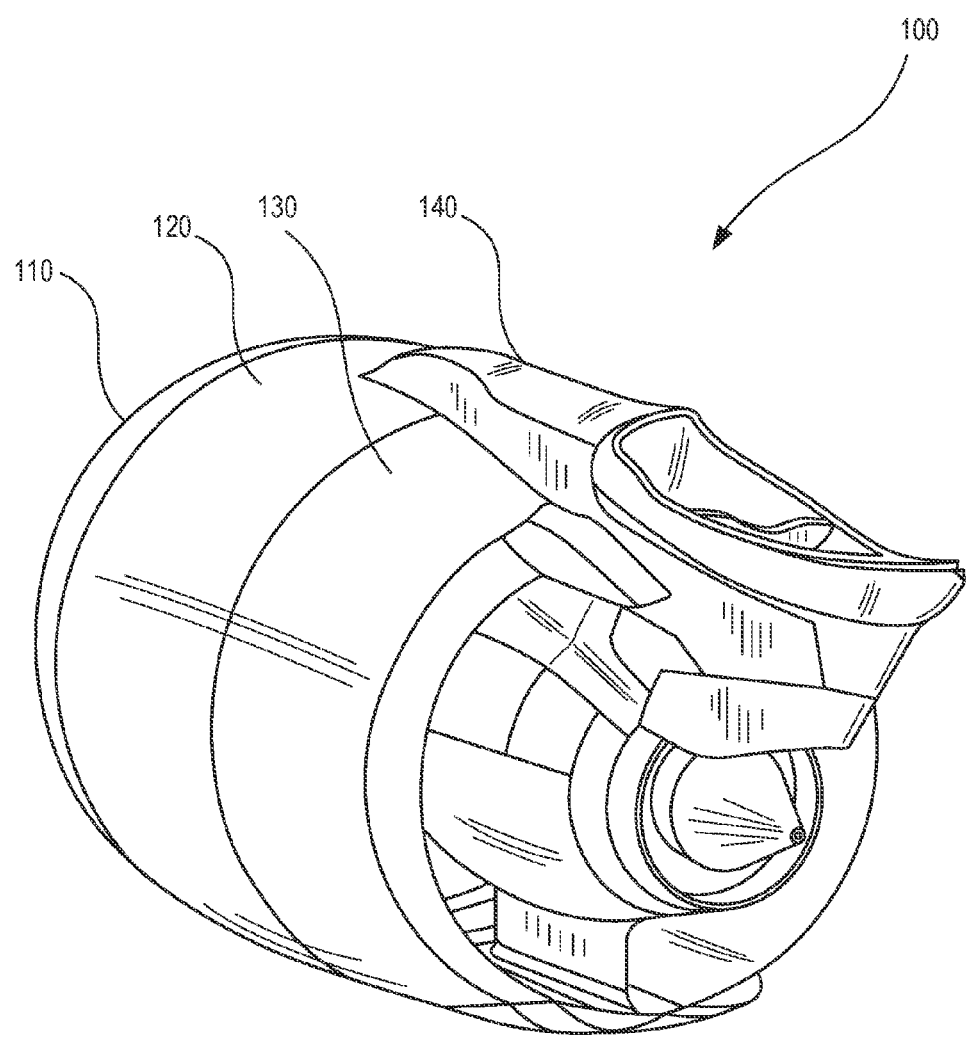
FIG. 1 illustrates a perspective view of a nacelle in accordance with various embodiments.

Referring to FIG. 1, a nacelle 100 for a gas turbine engine is illustrated according to various embodiments. The nacelle 100 may comprise an inlet 110, a fan cowl 120, and a thrust reverser 130. The nacelle 100 may be coupled, directly or indirectly, to a pylon 140, which may mount the nacelle 100 to an aircraft wing or aircraft body. The thrust reverser 130 may comprise a translating sleeve which translates relative to one or more track beams in order to deploy the thrust reverser 130.

Figure 2:
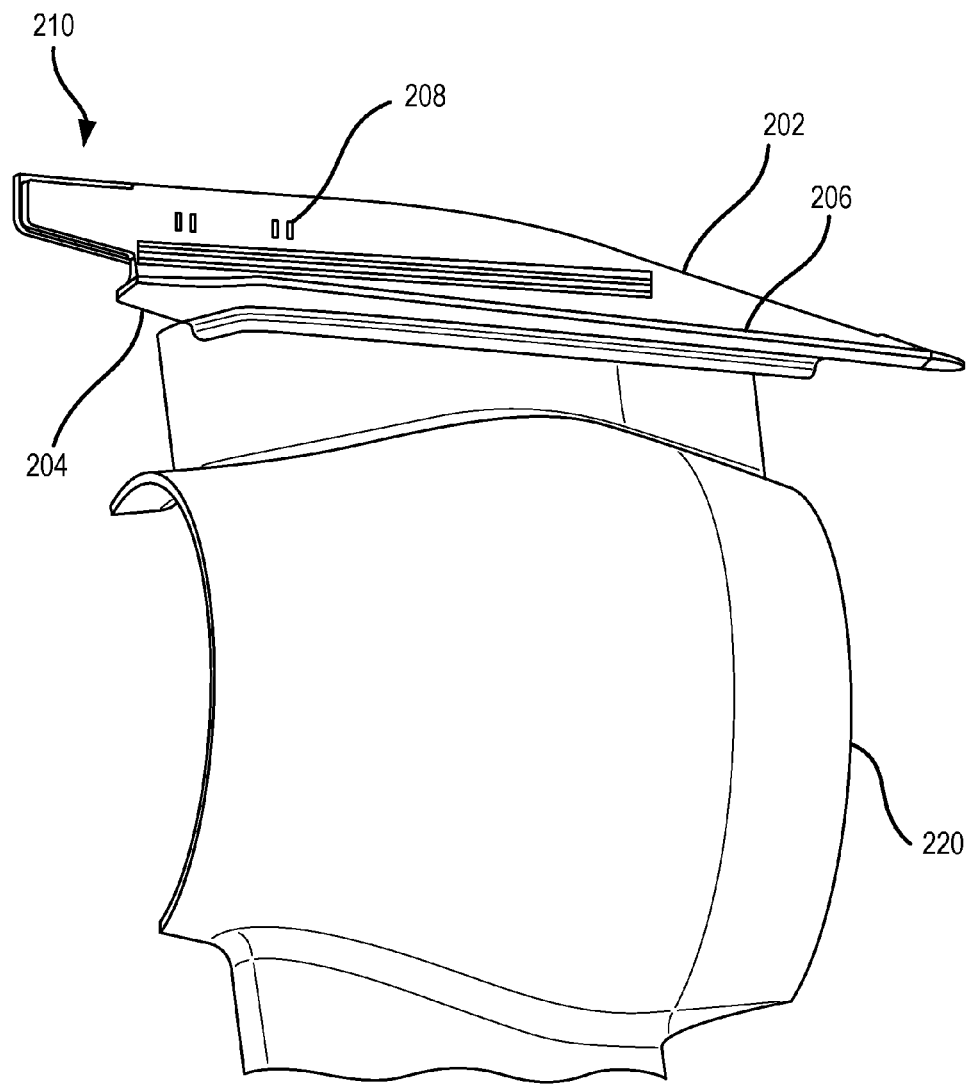
FIG. 2 illustrates a perspective view of a hinge beam and an inner fixed structure (IFS) in accordance with various embodiments.

Referring to FIG. 2, a schematic perspective view of a composite hinge beam 210 coupled to an IFS 220 is illustrated according to various embodiments. The composite hinge beam 210 may comprise two longitudinal composite panels 202, 204 of composite material that are integrally affixed to each other along a longitudinal edge 206. The composite hinge beam 210 may comprise a fibrous cloth impregnated with a resin, however other materials or metal, or a combination thereof may be used in various embodiments. The composite panels 202, 204 may be integrally affixed to each other by various methods, for example, welding, gluing or fastening. The composite panels 202, 204 may also be integrally affixed to each other during the composite lay-up process where contiguous sheets of fibrous cloth may be used to form both composite panels 202, 204 simultaneously, creating a unitary contiguous beam that is generally "L-shaped" in cross-section. The composite structure may be equipped with one or more reinforcement ribs along its length. The reinforcement ribs may run longitudinally, transverse, or in both directions and may be disposed on one or both composite panels 202, 204. The composite panels 202, 204 may comprise through-holes 208 for receiving lugs which may couple the composite hinge beam 210 to other portions of a nacelle.

Figure 3:
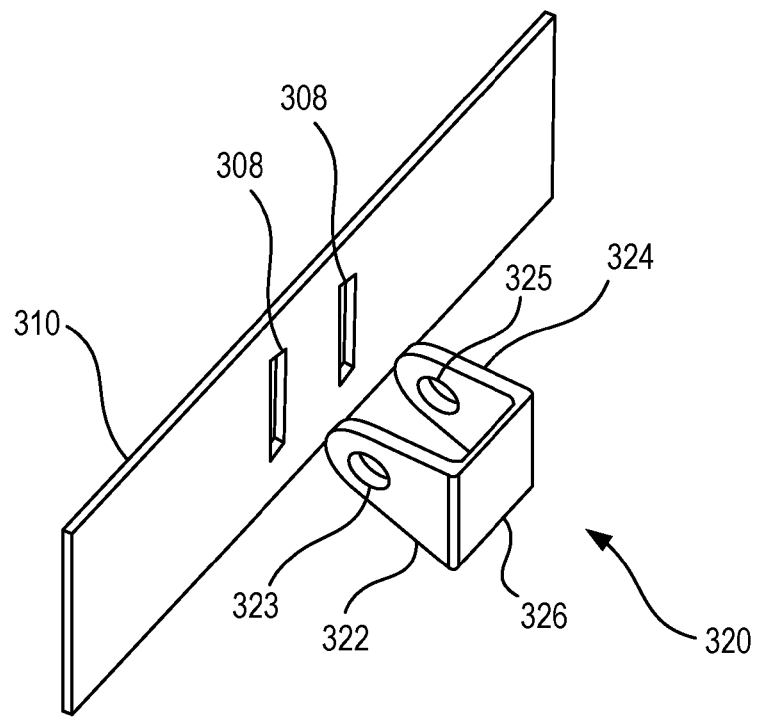
FIG. 3 illustrates a schematic perspective view of a portion of a track beam and a lug in accordance with various embodiments.

Referring to FIG. 3, a schematic perspective view of a lug 320 and a portion of a track beam 310 is illustrated according to various embodiments. The track beam 310 may comprise two through-holes 308. In various embodiments, the track beam 310 may comprise any suitable number of through-holes 308 to correspond with lugs of varying sizes and shapes. The through-holes 308 may be equally sized and shaped. The through-holes 308 may comprise vertical elongated slots. The through-holes 308 may be substantially parallel with each other.

The lug 320 may comprise a first flange 322 comprising a first attachment feature 323, a second flange 324 comprising a second attachment feature 325, and a support 326 connecting the first flange 322 to the second flange 324. The first attachment feature 323 and the second attachment feature 325 may be coaxial circular apertures in the first flange 322 and the second flange 324. In various embodiments, the lug 320 may comprise bushings within the apertures. The first flange 322 and the second flange 324 may be substantially perpendicular to the support 326. The first flange 322 and the second flange 324 may be substantially parallel to each other. As used herein, "substantially" means within +/−10% of a stated range or value.

Figure 4:
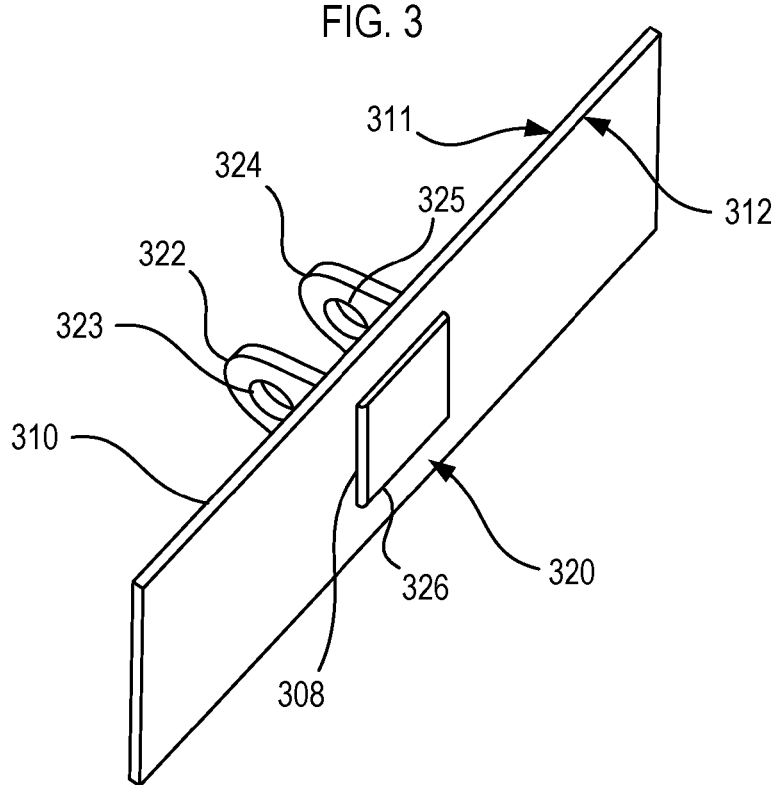
FIG. 4 illustrates a schematic perspective view of a portion of a track beam with the lug inserted in the track beam in accordance with various embodiments.

Referring to FIG. 4, the lug 320 is illustrated inserted in the track beam 310. The first flange 322 and the second flange 324 may be inserted through the through-holes 308 until the support 326 contacts the track beam 310. Thus, the first attachment feature 323 and the second attachment feature 325 may be located on a first side 311 of the track beam 310, and the support 326 may be located on an opposite second side 312 of the track beam 310. The attachment features 323, 325 may couple the track beam 310 to other components. The lug 320 may comprise a composite material. The composite material may comprise fibers, such as carbon fibers within a resin matrix. In various embodiments, the fibers may comprise carbon, glass, aramid or other known types. The matrix may be thermoset polymers such as epoxies, thermoplastics, and other known materials. In various embodiments, the fibers may comprise continuous fibers. A continuous fiber may extend along the first flange 322, through the support 326, and along the second flange 324. The continuous fibers may provide strength in the in-plane direction of the various portions of the lug 320.

In various embodiments, the lug 320 and/or the track beam 310 may comprise a thermoplastic material. Thus, the lug 320 and the track beam 310 may be co-cured by heating both components past the softening point such that the lug 320 and the track beam 310 fuse together when cooled and hardened. As such, the lug 320 and the track beam 310 may comprise a unitary component. In various embodiments, the lug 320 may be adhesively bonded, welded, co-cured, co-joined, or coupled to the track beam 310 in any other suitable manner.

Figure 5:
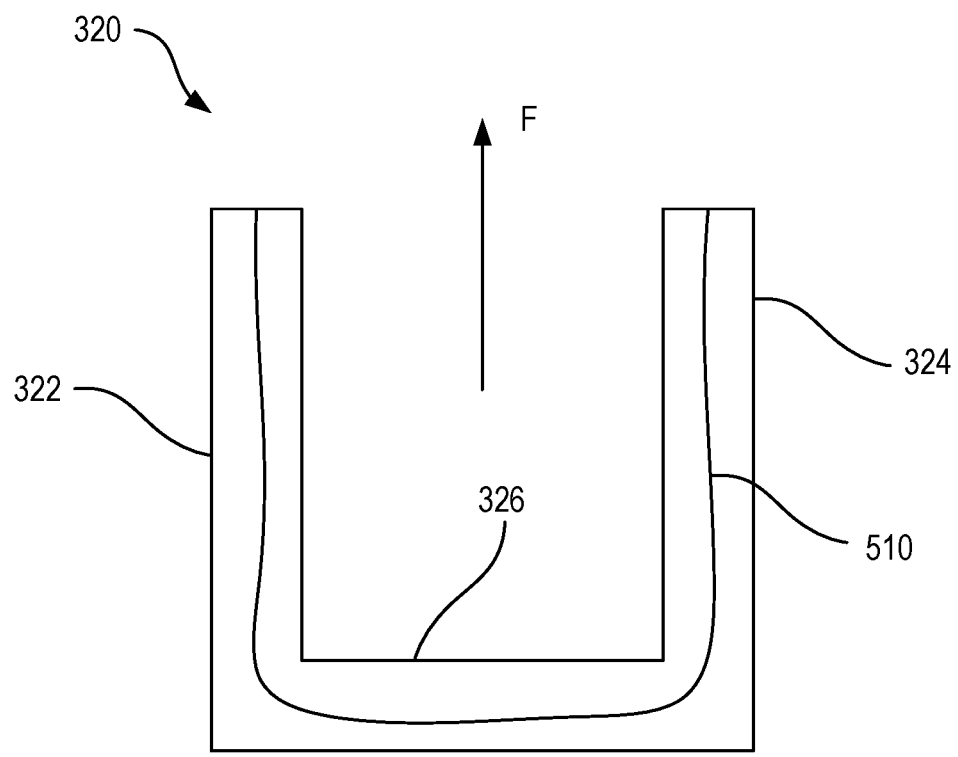
FIG. 5 illustrates a schematic cross-section view of a U-shaped lug in accordance with various embodiments.

Referring to FIG. 5, a schematic cross-section view of the lug 320 is illustrated according to various embodiments. As illustrated, the lug 320 may comprise a "U-shape." The lug 320 may comprise continuous fibers 510 which extend through the first flange 322, the support 326, and the second flange 324. In response to a force on the flanges 322, 324 in the direction shown by the arrow F, the in-plane properties of the lug 320 will provide strength to the lug 320, such that the lug 320 will tend to not fail without tearing apart the fibers 510.

The lug 320 may be shaped by a variety of processes. In various embodiments, the material for the lug 320 may be cut from a flat sheet of composite layers with continuous fibers, and may be bent into the shape of the lug 320 and subsequently cured and hardened. In various embodiments, a three-dimensional preform of the fibers 510 may be formed, and the lug 320 may be injection molded or resin may be vacuum injected to the fibers 510 to form the lug 320.

Figure 6:
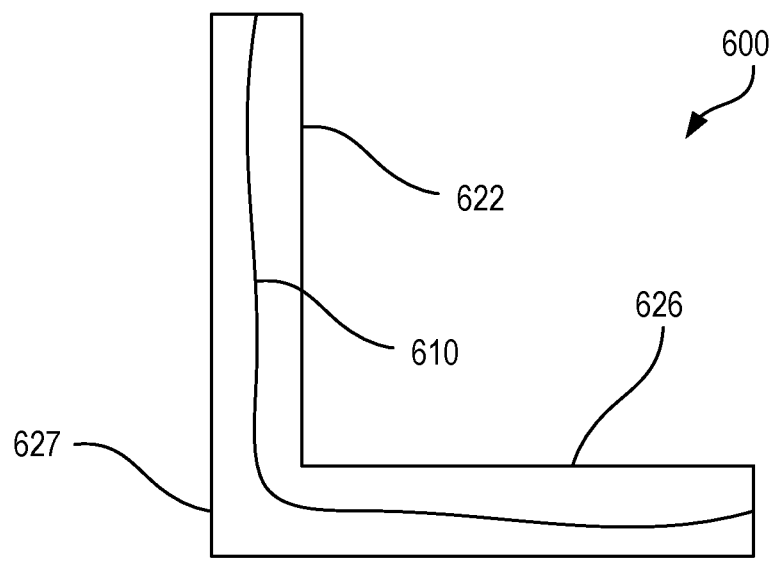
FIG. 6 illustrates a schematic cross-section view of an L-shaped lug in accordance with various embodiments.

Referring to FIG. 6, a schematic cross-section view of an "L-shaped" lug 600 is illustrated according to various embodiments. The L-shaped lug 600 may comprise a single flange 622 substantially perpendicular to a support 626. The single flange 622 may join with the support 326 at a first end 327 of the support 326. The L-shaped lug 600 may comprise continuous fibers 620 extending through the single flange 622 and the support 626.

Figure 7:
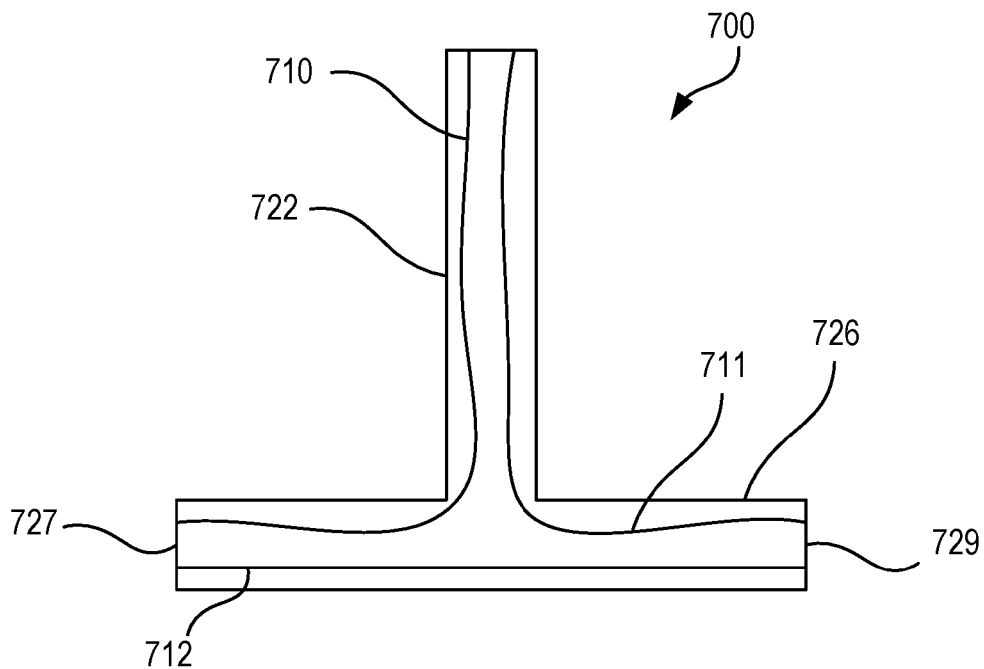
FIG. 7 illustrates a schematic cross-section view of a T-shaped lug in accordance with various embodiments.

Referring to FIG. 7, a schematic cross-section view of a "T-shaped" lug 700 is illustrated according to various embodiments. The T-shaped lug 700 may comprise a single flange 722 substantially perpendicular to a support 726. The single flange 722 may join with the support 726 at a midpoint of, or any other suitable location between, a first end 727 of the support 726 and a second end 729 of the support 726. In various embodiment, the T-shaped lug 700 may be formed by joining two L-shaped lugs together at their respective flanges. In various embodiments, the T-shaped lug 700 may comprise first continuous fibers 710 extending along the single flange 722 and through the support 726 to the first end 727 of the support 726, and second continuous fibers 711 extending along the single flange 722 and through the support 726 to the second end 729 of the support 726. In various embodiments, the T-shaped lug 700 may comprise third continuous fibers 712 that extend from the first end 727 of the support 726 to the second end 729 of the support 726 and do not extend into the single flange 722.

Figure 8:
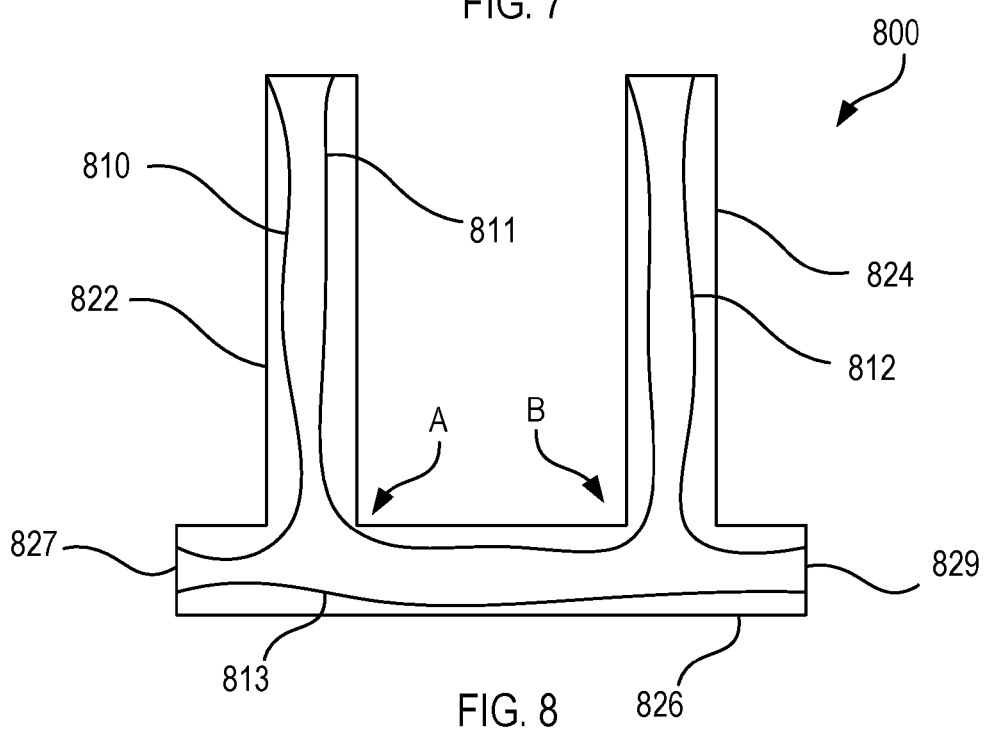
FIG. 8 illustrates a schematic cross-section view of a Pi-shaped lug in accordance with various embodiments.

Referring to FIG. 8, a "Pi-shaped" lug 800 is illustrated according to various embodiments. The Pi-shaped lug 800 may comprise a first flange 822 and a second flange 824. The first flange 822 and the second flange 824 may be substantially perpendicular to a support 826. The first flange 822 may join with the support 826 at a first point A between a first end 827 and a second end 829 of the support 826. The second flange 824 may join with the support 826 at a second point B between the first end 827 and the second end 829 of the support 826. The Pi-shaped lug 800 may comprise first continuous fibers 810 extending along the first flange 822 and through the support 826 to the first end 827 of the support 826. The Pi-shaped lug 800 may comprise second continuous fibers 811 extending along the first flange 822, through the support 826 from the first point A to the second point B, and through the second flange 824. The Pi-shaped lug 800 may comprise third continuous fibers 812 extending through the second flange 824 and through the support 826 to the second end 829 of the support 826. In various embodiments, the Pi-shaped lug 800 may comprise fourth continuous fibers 813 that extend from the first end 827 of the support 826 to the second end 829 of the support 826 and do not extend along the first flange 822 or the second flange 824. In various embodiments, the Pi-shaped lug 800 may be formed by coupling two L-shaped lugs to a U-shaped lug. Those skilled in the art will appreciate that the lug shapes illustrated in FIGS. 5-8 are just a few examples of lug shapes, and many other lug shapes may be utilized.

Figure 9:
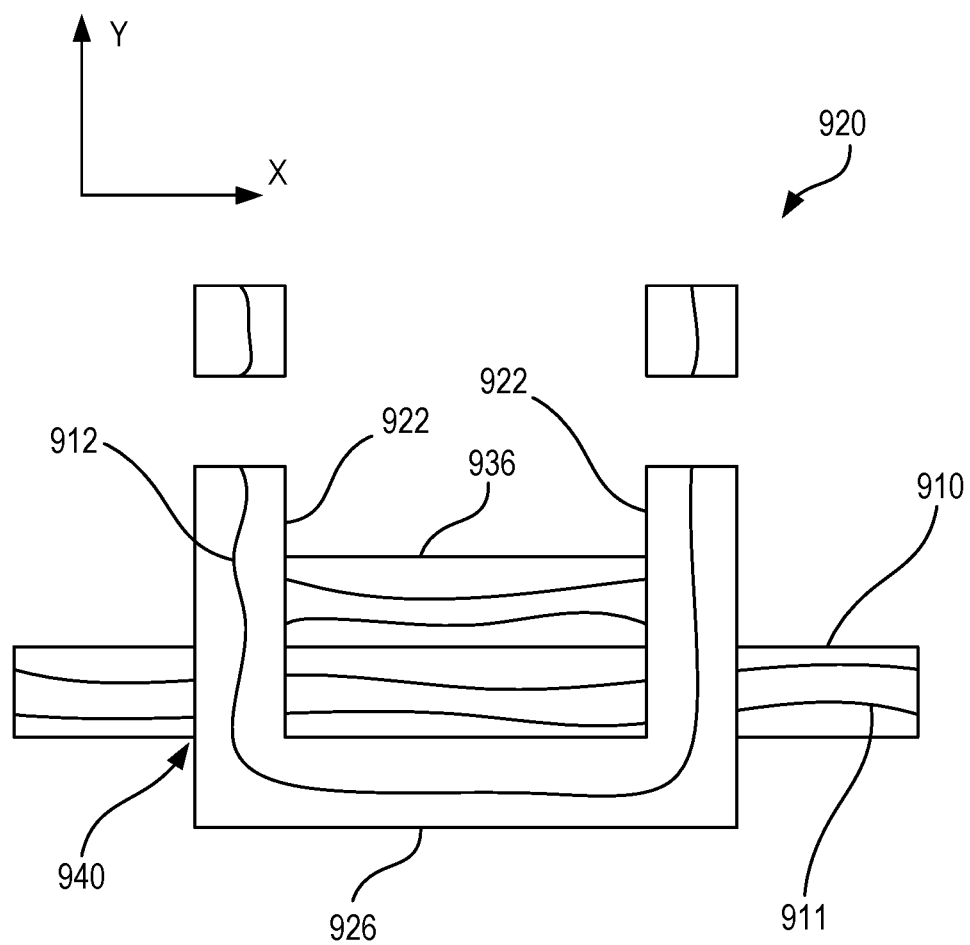
FIG. 9 illustrates a schematic cross-section view of a lug in a track beam with a second support in accordance with various embodiments.

Referring to FIG. 9, a schematic cross-section view of a U-shaped lug 920 in a track beam 910 is illustrated according to various embodiments. X-y axes are provided for ease of illustration. The track beam 910 may comprise continuous fibers 911 along the length of the track beam 910 in the x-direction. The U-shaped lug 920 may comprise continuous fibers 912 which are in the y-direction in the flanges 922 and in the x-direction in the support 926. In various embodiments, a second support 936 may couple the flanges 922 together after inserting the U-shaped lug 920 through the through-holes 940. The second support 936 may prevent the U-shaped lug 920 from being pushed out the track beam 910 in the negative y-direction in response to a load on the flanges 922 in the negative y-direction. In various embodiments, the second support 936 may comprise a thermoplastic material. The U-shaped lug 920, the track beam 910, and the second support 936 may be heated and fused together into a unitary component.

Figure 10:
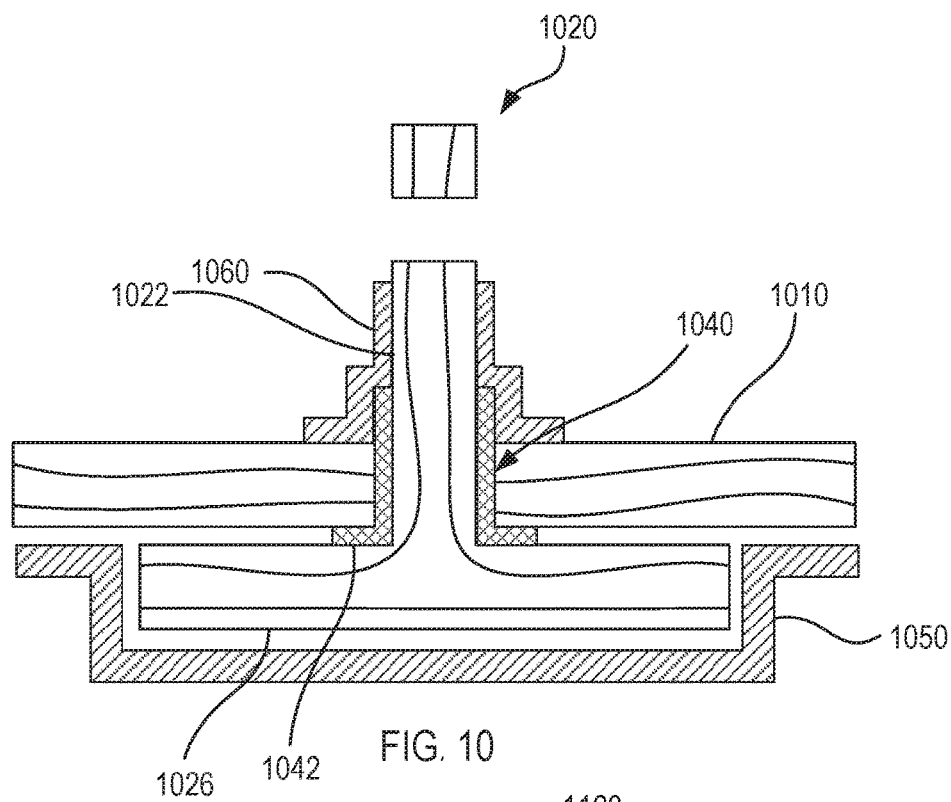
FIG. 10 illustrates a schematic cross-section view of a lug in a track beam with a receptacle in accordance with various embodiments.

Referring to FIG. 10, a schematic cross-section view of a T-shaped lug 1020 in a track beam 1010 with a receptacle 1042 is illustrated according to various embodiments. The receptacle 1042 may be located within the through-hole 1040. In various embodiments, the receptacle 1042 may comprise a composite, metallic, elastomeric, or any other suitable material. In various embodiments, the receptacle 1042 may provide support to the lug 1020 and decrease bending in the lug 1020. In various embodiments, a composite ply 1050 may be coupled to the support 1026 and the track beam 1010. The composite ply 1050 may cover the support 1026. In various embodiments, a support 1060 may be coupled to the flange 1022 and the track beam 1010.

Figure 11:
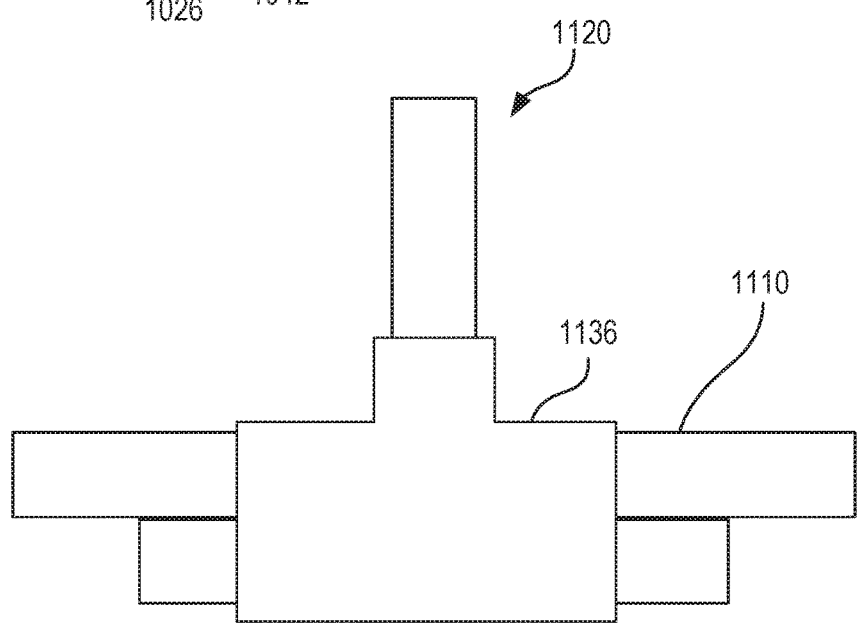
FIG. 11 illustrates a schematic top view of a lug in a track beam with a brace in accordance with various embodiments.

Referring to FIG. 11, a schematic top view of a T-shaped lug 1120 in a track beam 1110 with a brace 1136 coupled to the top of the track beam 1110 is illustrated according to various embodiments. In various embodiments, the brace 1136 may extend from a top of the track beam 1110 to a bottom of the track beam 1110. In various embodiments, one brace 1136 may be located at the top of the track beam 1110, and another brace may be coupled to a bottom of the track beam 1110. The brace 1136 may be generally T-shaped and decrease bending of the lug 1120.

Figure 12:
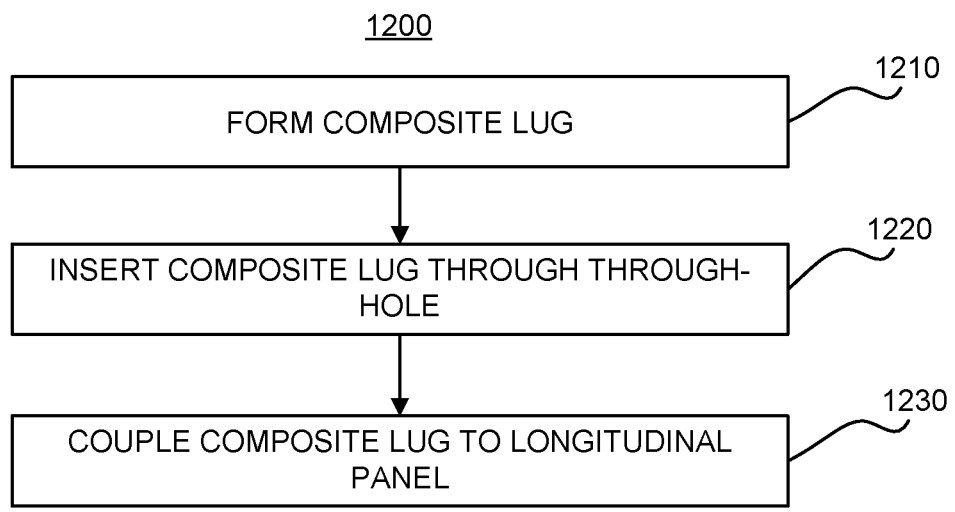
FIG. 12 illustrates a flowchart of a process for manufacturing a track beam in accordance with various embodiments.

Referring to FIG. 12, a flowchart 1200 of a process for manufacturing a track beam is illustrated according to various embodiments. A composite lug may be formed (step 1210). In various embodiments, the composite lug may be formed by cutting a piece of material from a composite sheet comprising continuous fibers and bending the piece of material into the desired shape. The composite lug may be inserted through a through-hole in a longitudinal panel of a track beam (step 1220). The composite lug may be coupled to the longitudinal panel (step 1230). In various embodiments, the composite lug and the longitudinal panel may each comprise a thermoplastic material. The composite lug and the longitudinal panel may be heated and fused into a unitary component.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

We claim:

1. A track beam for an aircraft nacelle comprising:
    a first longitudinal panel;
    a second longitudinal panel integrally affixed to the first longitudinal panel along a longitudinal edge, the second longitudinal panel comprising a through-hole; and
    a lug coupled to the second longitudinal panel, the lug comprising:
        a portion of a first flange located on a first side of the second longitudinal panel, the first flange extending through the through-hole;
        a support located on a second side of the second longitudinal panel; and
        a continuous fiber located partially within the first flange and partially within the support, wherein
        the lug is configured to fuse to the second longitudinal panel.

2. The track beam of claim 1, wherein the lug comprises a composite material.

3. The track beam of claim 1, wherein the lug comprises a thermoplastic material.

4. The track beam of claim 1, wherein the second longitudinal panel and the lug are configured to form a unitary component.

5. The track beam of claim 1, wherein the lug comprises a second flange on the first side of the second longitudinal panel.

6. The track beam of claim 5, further comprising a second continuous fiber located partially within the second flange and partially within the support.

7. The track beam of claim 1, wherein the lug comprises at least one of a U-shape or a Pi-shape.

8. The track beam of claim 1, wherein the second longitudinal panel and the lug are co-cured.

9. The track beam of claim 1, wherein the first flange comprises an attachment feature.

\* \* \* \* \*